(12) United States Patent
Patel

(10) Patent No.: US 7,363,320 B2
(45) Date of Patent: Apr. 22, 2008

(54) METHOD AND SYSTEM FOR CORRELATING DATA FROM MULTIPLE SOURCES WITHOUT COMPROMISING CONFIDENTIALITY REQUIREMENTS

(75) Inventor: Baiju V. Patel, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 935 days.

(21) Appl. No.: 10/838,509

(22) Filed: May 4, 2004

(65) Prior Publication Data

US 2004/0205080 A1 Oct. 14, 2004

Related U.S. Application Data

(63) Continuation of application No. 09/678,235, filed on Oct. 4, 2000, now abandoned.

(51) Int. Cl.
*G06F 17/30* (2006.01)
(52) U.S. Cl. .................................. 707/104.1; 707/101
(58) Field of Classification Search ............. 707/104.1; 713/201, 155
See application file for complete search history.

(56) References Cited

U.S. PATENT DOCUMENTS

| 5,987,232 | A  |   | 11/1999 | Tabuki |
|-----------|----|---|---------|--------|
| 6,041,357 | A  |   | 3/2000  | Kunzelman et al. |
| 6,301,658 | B1 |   | 10/2001 | Koehler |
| 6,308,277 | B1 |   | 10/2001 | Vaeth et al. |
| 6,321,339 | B1 | * | 11/2001 | French et al. ............ 726/2 |

* cited by examiner

*Primary Examiner*—Yicun Wu
(74) *Attorney, Agent, or Firm*—Pillsbury Winthrop Shaw Pittman LLP

(57) ABSTRACT

A method and system is provided for correlating data. A data tuple includes a unique record ID and a record. At least one data tuple is sent from a data supplier to a data user. An entity correlator receives at least one pair of the record ID and an identifying ID from a data supplier. The data user forwards a record ID list to the entity correlator. The record ID list includes at least one record ID. The entity correlator generates an entity list and sends it to the data user. The entity list correlates each entity in the entity list with the at least one record ID.

27 Claims, 13 Drawing Sheets

DuserData$_j$

| $\{(DsupplierID_{j1}, RecNum, Rec)\}_{j1}$ |
| --- |
| $\{(DsupplierID_{j2}, RecNum, Rec)\}_{j2}$ |
| ⋮ |
| $\{(DsupplierID_{ji}, RecNum, Rec)\}_{ji}$ |
| ⋮ |
| $\{(DsupplierID_{jk}, RecNum, Rec)\}_{jk}$ |

FIG.8

RecIDList$_j$

| DsupplierID$_{ji}$ | $\{RecNum\}_{ji}$ |
| --- | --- |
| ⋮ | ⋮ |
| DsupplierID$_{jl}$ | $\{RecNum\}_{jl}$ |

FIG.9

EntityList

| EntityNum$_1$ | $\{DsupplierID, \{RecNum\}\}_1$ |
|---|---|
| $\vdots$ | $\vdots$ |
| EntityNum$_i$ | $\{DsupplierID, \{RecNum\}\}_i$ |
| $\vdots$ | $\vdots$ |
| EntityNum$_k$ | $\{DsupplierID, \{RecNum\}\}_k$ |

FIG. 13

METHOD AND SYSTEM FOR CORRELATING DATA FROM MULTIPLE SOURCES WITHOUT COMPROMISING CONFIDENTIALITY REQUIREMENTS

RELATED APPLICATIONS

This application is a continuation application of U.S. patent application Ser. No. 09/678,235, filed Oct. 4, 2000 now abandoned.

RESERVATION OF COPYRIGHT

The disclosure of this patent document contains material, which is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever.

BACKGROUND OF THE INVENTION

1. Field of the Invention

Aspects of the invention generally relate to the field of information. Specifically, aspects of the present invention relate to a method and system that correlates information from multiple sources without compromising confidentiality requirements.

2. Description of Related Art

In an information age, vast amounts of data are continuously collected. Such collected data may be digital or non-digital. The data includes both public data, such as a congressional archive, and private data, such as patients' medical records in a hospital. Different organizations, public or private, record data to serve their different needs. For example, a common practice in an e-commerce environment is to build individualized customer profiles based on on-line collected customer information. Different businesses such as banking, investment, retail, travel, entertainment, real estate, and dating services usually design specific customer profiles to fit their business needs. For instance, for a particular customer, a travel agency may wish to gather information about the customer's hobbies, places traveled in the last 3 years, or a preference between a beach and a ski resort, while an on-line music store may wish to know the customer's preferred music categories, such as Jazz or classical music to effectively target advertising to the customer on the web. Similarly, for a particular patient, the patient's medical records at a dermatologist's clinic and the patient's records at an allergist's clinic will contain substantially different content. In both cases, the only common content between the two data collections for the same person may be some unique personal identification information.

Large amounts of data collected have led to an inventive usage of data that further creates new information. When data from different collections are jointly examined, new useful information may be extracted. In the above examples, various customer profiles collected by different business practices for a particular customer can be collectively examined so that a new profile about a person's overall spending pattern may be extracted. Another example is medical records. If patients' treatment records can be examined together with the lab test records (these two types of records are often stored in different collections), it is possible to generate information about the kind of drugs that are effective for particular types of patients.

Such combined usage of data requires that different data sets be properly correlated. In the above example, assume that the lab test records are in data collection A and the treatment records (e.g., what drug is used with what dose at what time interval) are in data collection B. To jointly use both types of data to analyze the effectiveness of a particular drug, the lab test results for individual patients (from A) have to be correlated with the corresponding treatment records (from B) before the analysis can be performed.

The information, based on which the correlation between different data sets can be made, may be some unique IDs such as patients' social security numbers. Such information is identifying because it reveals identifying information. The use of such identifying information may pose a serious confidentiality or privacy issue. For example, even though the lab results and treatment records described above may be initially stored individually and privately, the combined information derived by correlating different data sets using identifying information exposes certain private information such as, for example, the diagnosis, to a scope that is not originally intended. Therefore, while inventive usage of data can generate other useful information, the possible side effect related to confidentiality or privacy issues has to be eliminated. New methods are needed to enable effective and inventive usage of data without violating confidentiality requirements.

BRIEF DESCRIPTION OF THE DRAWINGS

The above and other objects, features and advantages of the present invention are further described in the detailed description which follows, with reference to the drawings by way of non-limiting exemplary embodiments of the present invention. It is noted that, throughout the description, like reference numerals represent similar parts of the present invention throughout the several views and wherein:

FIG. 8 illustrates an exemplary representation of the data at a DataUser;

FIG. 9 illustrates an exemplary representation of a record ID list;

FIG. 13 illustrates an exemplary representation of an entity list; and

DETAILED DESCRIPTION

The following description presents a method and system that is consistent with the principles of the present invention and that addresses the need identified above to correlate data sets from multiple sources without compromising confidentiality requirements.

Figure 1:
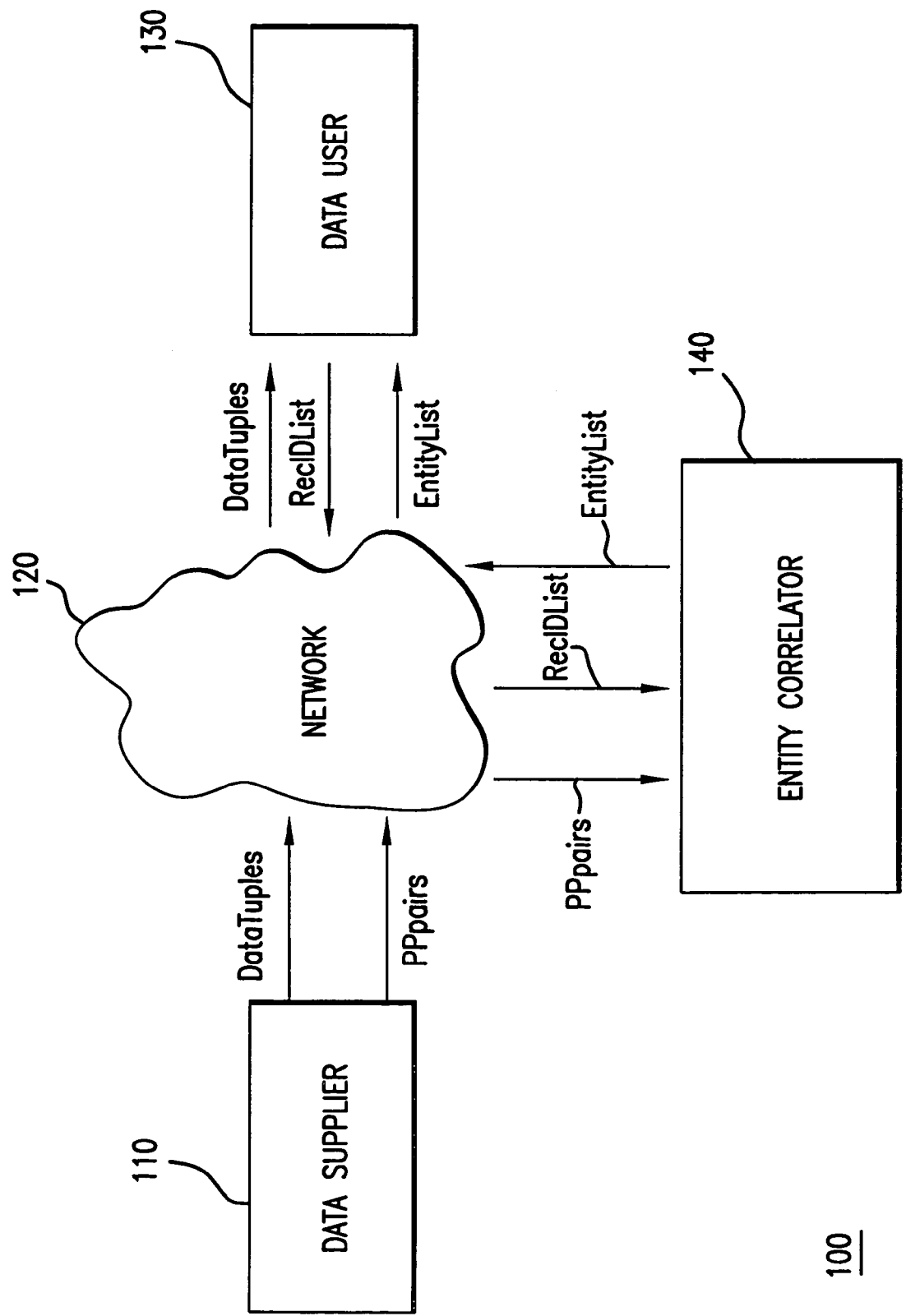
FIG. 1 illustrates an embodiment of the invention in which a DataSupplier, a DataUser, and an Entity Correlator, all connected through a network, are shown.

FIG. 1 illustrates the first embodiment of the invention 100, in which computers functioning as a DataSupplier 110, a DataUser 130, and an entity correlator 140 are connected via a network 120. There may be multiple DataSupliers, each of which may independently collect or generate information or data. The DataSupplier 110 may be associated with, but is not limited to, a web site, a hospital, or a company. The collected information at each DataSupplier 110 may include a plurality of records that may contain both information that is identifying (i.e., its use may be restricted) and information that may not be associated with confidentiality or privacy concerns. Examples of identifying information may be personal or company information. Identifying information reveals private identification information. Each of the records may be associated with unique identification information such as a record ID.

DataSupplier 110 generates two types of data from the collected information. One type is called data tuples (DataTuples). DataTuples contain no identifying information. Each data tuple may include a record ID, as an identification, and a non-identifying record. The other type of data generated by DataSupplier 110 is called private-to-public pairs (PPpairs). Here, private refers to identifying information. Public refers to non-identifying information. Each PPpair corresponds to a data tuple and contains a pair of information: identifying information of an original record and a record ID which is identical to the record ID used in a corresponding data tuple. Data tuples are sent to DataUser 130 and PP pairs are sent to an entity correlator 140, both via network 120.

There may be multiple DataUsers 130, each of which may be associated with, but is not limited to, a research institute, a pharmaceutical company, or a hospital and each may gather data from multiple DataSuppliers 110 and use the data independently for its own purposes. For example, a DataUser 130 corresponding to a research institute may collect patient diagnosis records from a hospital (one data supplier) and blood test results from a laboratory (a different data supplier), and then jointly use the data from both sources to determine the effectiveness of a certain drug. The data tuples received at DataUser 130 from DataSupplier 110 are a plurality of records, containing only non-identifying content.

To properly cross index the data tuples from possibly different data suppliers, a DataUser 130 may request entity correlation service from the entity correlator 140. To do so, the DataUser 130 generates at least one record ID corresponding to at least one record that is to be examined for correlation. Such generated record IDs form a record ID list (RecIDList) which is then sent to the entity correlator 140. This is illustrated in FIG. 1. From DataUser 130, a RecID-List is sent to entity correlator 140 via network 120. The network 120 in FIG. 1 may be, but is not limited to, the Internet or a LAN.

Entity correlator 140 provides the above mentioned cross indexing service that organizes the records in question into entities, each of which may include a plurality of records from possibly multiple DataSuppliers 110. Entity correlator 140 also receives at least one PPpair from DataSupplier 110 which is stored within the entity correlator for future use.

Since each PP pair provides the correspondence between the identifying information and the record ID of a record, the PP pair may be used to identify the record IDs that correspond to the same entity. When a RecIDList arrives at the entity correlator, all the record IDs in the list can be correlated in this fashion based on pre-stored PP pairs. The correlation results in a partition of the record IDs in RecIDList. Each portion in the partition may include one or more record IDs which correspond to one entity. Entity correlator 140 forms an entity list (EntityList) which describes the partition and sends the EntityList back to DataUser 130 via network 120.

Figure 2:
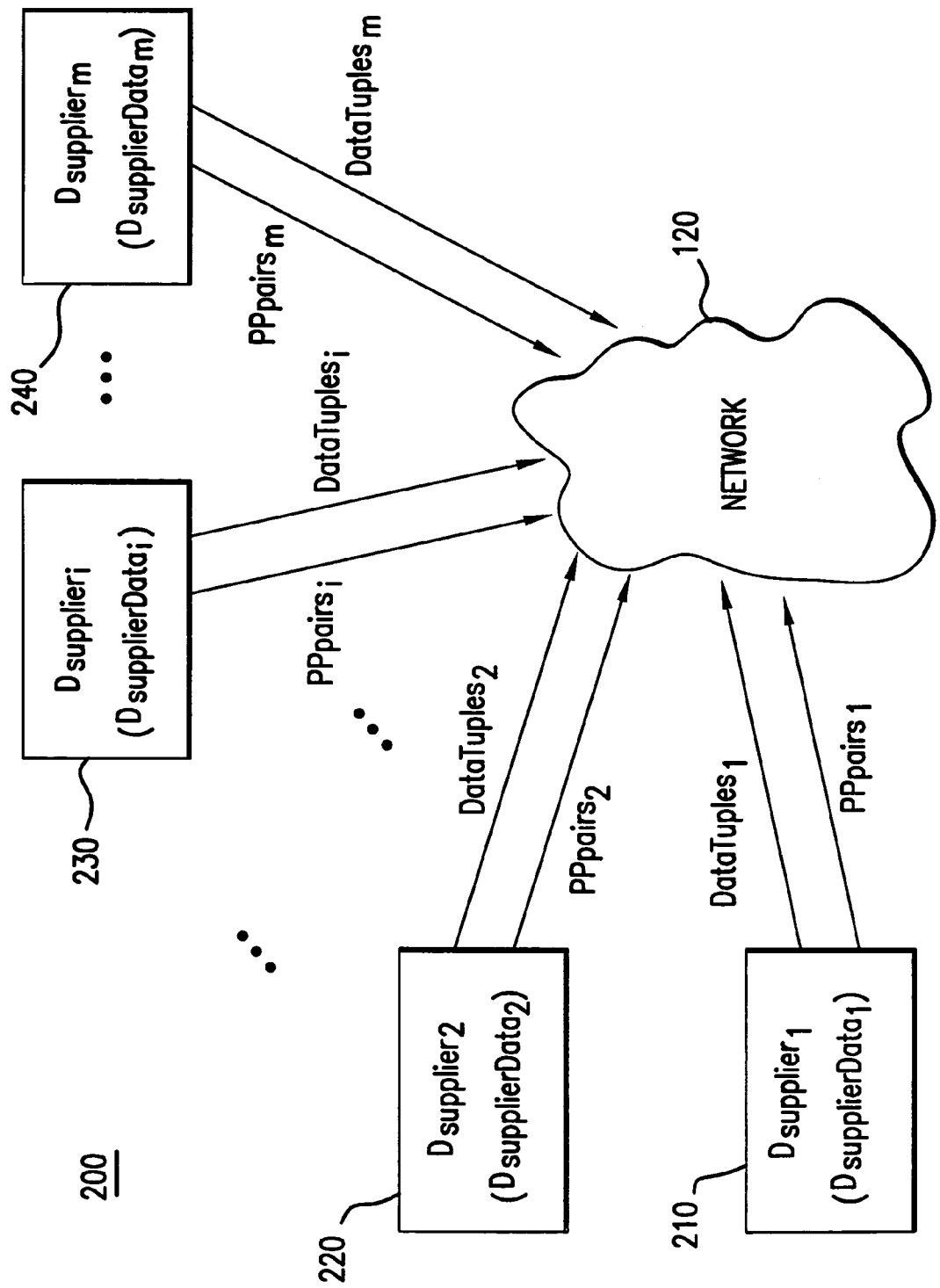
FIG. 2 shows multiple data suppliers connecting to a network.
Figure 3:
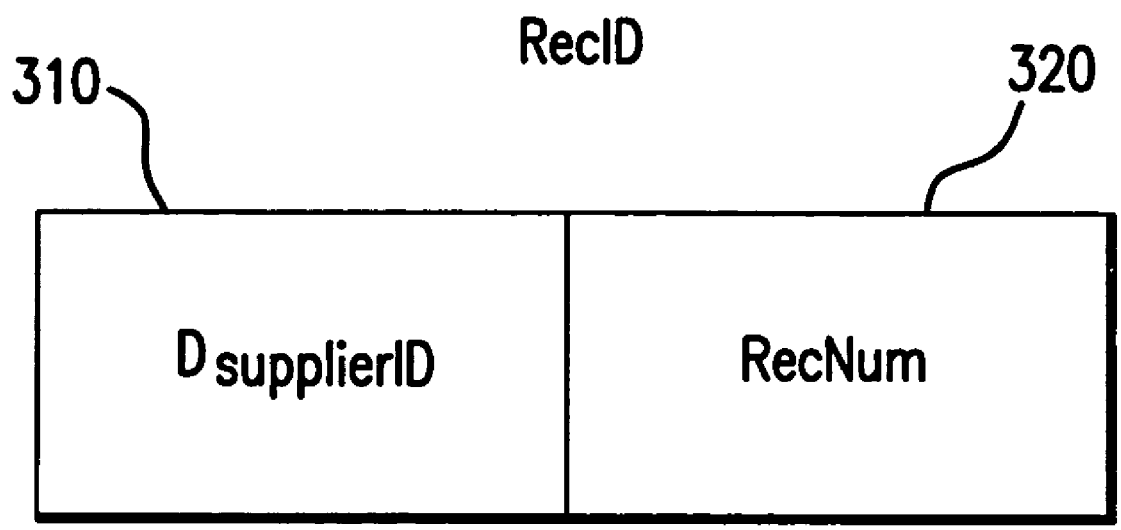
FIG. 3 illustrates an exemplary representation of a record ID.

As mentioned earlier, multiple data suppliers may independently collect data, generating DataTuples and PPpairs, and sending generated data to both DataUser 130 and entity correlator 140 via network 120. FIG. 2 shows an embodiment of the invention with more than one DataSupplier. Each data supplier DataSupplieri, $1 \leq i \leq m$, corresponding to 210, 220, ..., 230, ... 240, has its own data DsupplierDatai which includes DataTuplesi and PPpairsi, respectively. A data supplier creates a record ID for each and every of its collected records. The record ID has to be unique. One exemplary representation of a record ID is illustrated in FIG. 3 where a record ID, denoted by RecID, comprises a data supplier ID, denoted by DsupplierID, and a record number, denoted by RecNum. If each data supplier is also associated with a unique identifier of its own (such as a URL), the data supplier ID may be used to construct record IDs so that records from different suppliers can be unambiguously identified.

In the illustrated embodiment, a data supplier includes a mechanism to generate and to assign unique record numbers to its collected records. As illustrated in FIG. 3, a unique record ID may be generated by coupling the data supplier ID (DsupplierID) with the generated record numbers (RecNum). Using such formed record IDs, it is possible to trace every record to where it is collected, which is often necessary in order to correlate the records from different data suppliers.

Figure 4:
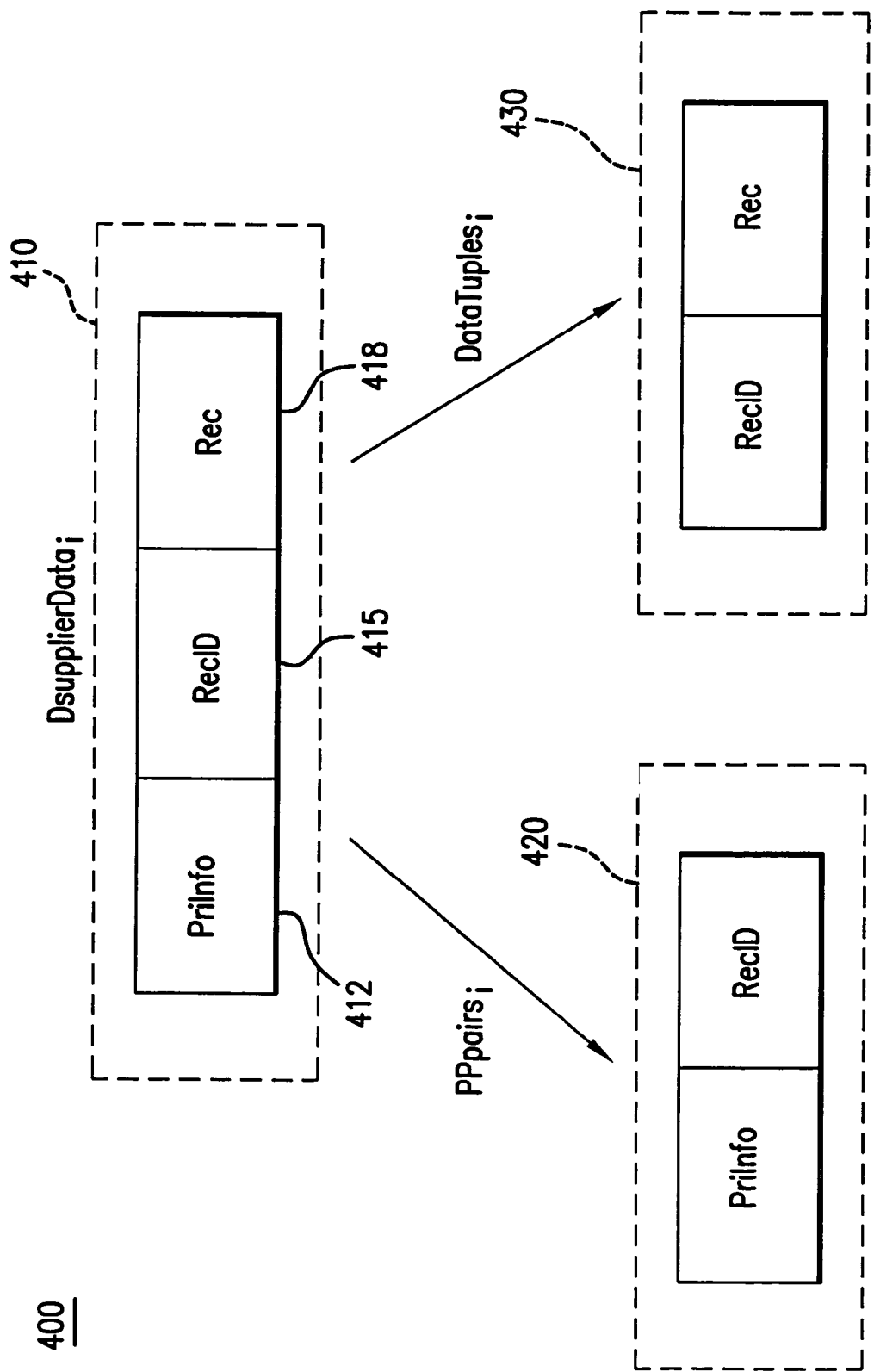
FIG. 4 shows exemplary relationships among different pieces of the data at a DataSupplier.

Information collected at a data supplier may include both identifying and non-identifying information. In addition, for each record, a record ID is generated so that it can be used to uniquely identify the record when needed. To ensure an effective use of data without violating confidentiality requirements, identifying and non-identifying information is to be handled separately. FIG. 4 shows an exemplary decomposition of the data at a data supplier. Data DsupplierDatai 410 at data supplier Dsupplieri is viewed as comprising three parts: the identifying or private part (PriInfo 412), the record ID (RecID 415), and the non-identifying record (Rec 418). In the illustrated embodiment of the invention, data tuples do not contain any identifying content, PP pairs have to retain the correspondence between the identifying content and record Ids, and PP pairs do not contain any non-identifying content of the record. FIG. 4 shows a possible decomposition. A data tuple, DataTuplei 430, is formed by a record ID (RecID 415) and the non-identifying record (Rec 418). A PP pair, PPpairsi 420, is formed by a record ID (RecID 415) and the identifying information (PriInfo 412). Here, the record ID RecID appears in both, building a necessary link between the data tuple and its corresponding PP pair.

When there are multiple records at a particular data user from one or more data suppliers, some of these multiple record may correspond to the same entity (e.g., multiple records of a same patient). For example, a plurality of data tuples may include a set of records, each having a unique RecID, but some of the records may correspond to the blood test results of a same patient collected over a one year treatment period. These test results may be from different labs, each may have multiple test results. As can be seen in FIG. 4, the correspondence of these records to the same patient may be identified only if the patient's identifying information is compared and recognized as so. Since a data user receives only non-identifying information so that it does not possess the information (often private or confidential) that is necessary to identify the correlation among records, it is not possible for the data user to recognize the correlation. The reason is that every record at a data user has a different record ID. The information that is needed to make the correlation is stored at the entity correlator in the form of PP pairs. Therefore, the entity correlator is the only place where such correlation can be recognized. This is done by examining record IDs together with the PP pairs saved a priori at the entity correlator. In this scenario, since the data users do not possess identifying information, their uses of data will not compromise the confidentiality requirements. At the same time, since the entity correlator has only pairs of identity correspondence without real record data (e.g., blood test results), the service it provides does not pose any threat to confidentiality requirements either. In this fashion, the correspondence between a set of records, which may come from a single or multiple data suppliers, and a single entity can be identified without compromising the confidentiality.

As indicated above, the correlation may be recognized by matching the identifying or private information (PriInfo) from different DataSuppliers. The identifying information may or may not be unique. For example, a social security number is a piece of identifying information that is unique. On the other hand, a person's name is not unique. For instance, a patient's name from different suppliers may differ (e.g., it may appear with a middle name in the data from one supplier and without the middle name in the data from another supplier). Different matching methods may be applied for matching different types of information.

Figure 5:
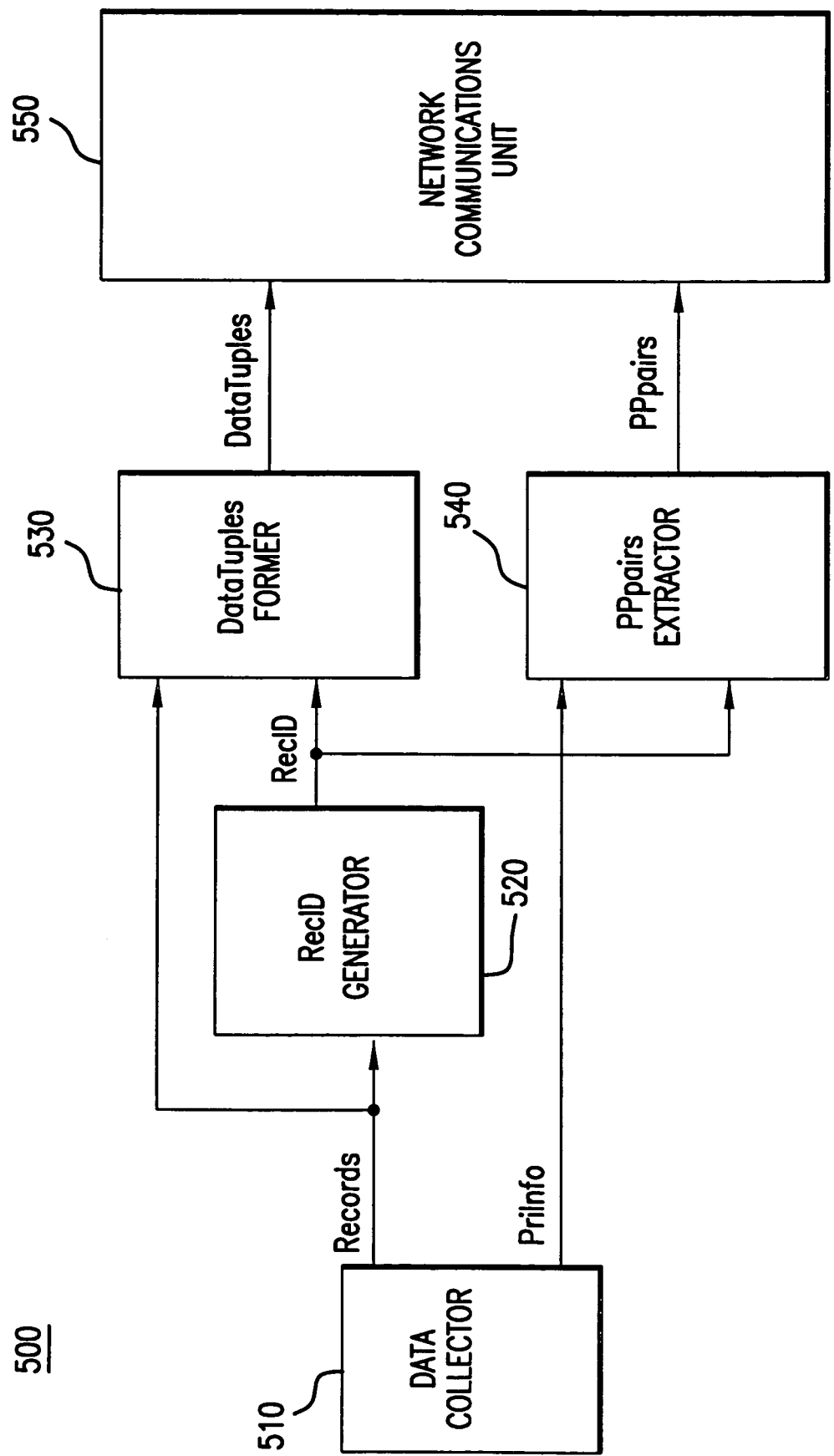
FIG. 5 illustrates an embodiment of the invention, in which a block diagram of a DataSupplier is shown.

FIG. 5 is a high level diagram for DataSupplier 110. Data is initially collected at 510. The identifying information is then separated from the originally collected data and sent to 540 where PP pairs are to be extracted. The rest of the data that does not include any identifying information, namely records, is sent to a record ID generator 520. The generated RecID from 520 is then sent to a data tuples former 530 that, taking also the non-identifying records as its input, generates data tuples by coupling each generated record ID with the record itself. The generated record ID is also sent to 540 so that a PP pair can be generated. The data tuples from 530 and the PP pairs from 540 are sent to DataUser 130 and entity correlator 140 through its network communication unit 550, respectively.

Figure 6:
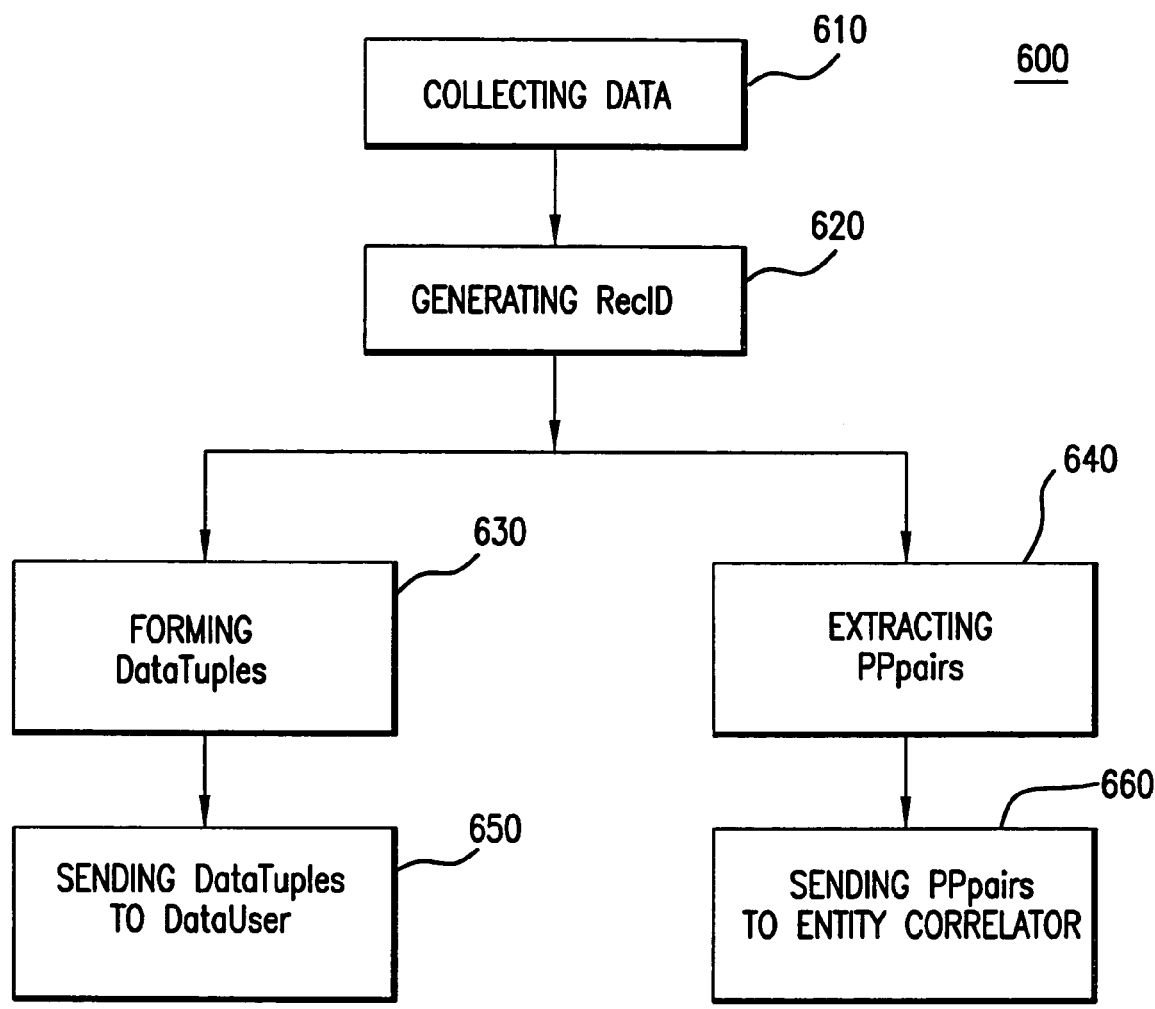
FIG. 6 is a flowchart of an embodiment of the invention, in which a DataSupplier generates different pieces of data.

FIG. 6 shows a flowchart of an embodiment of the invention where data tuples and PP pairs are generated at 630 and 640 from the data collected at 610 and sent to DataUser 130 and to entity correlator 140, respectively, via network 120. Record IDs are generated based on collected records at 620 prior to generating the data to be sent.

Figure 7:
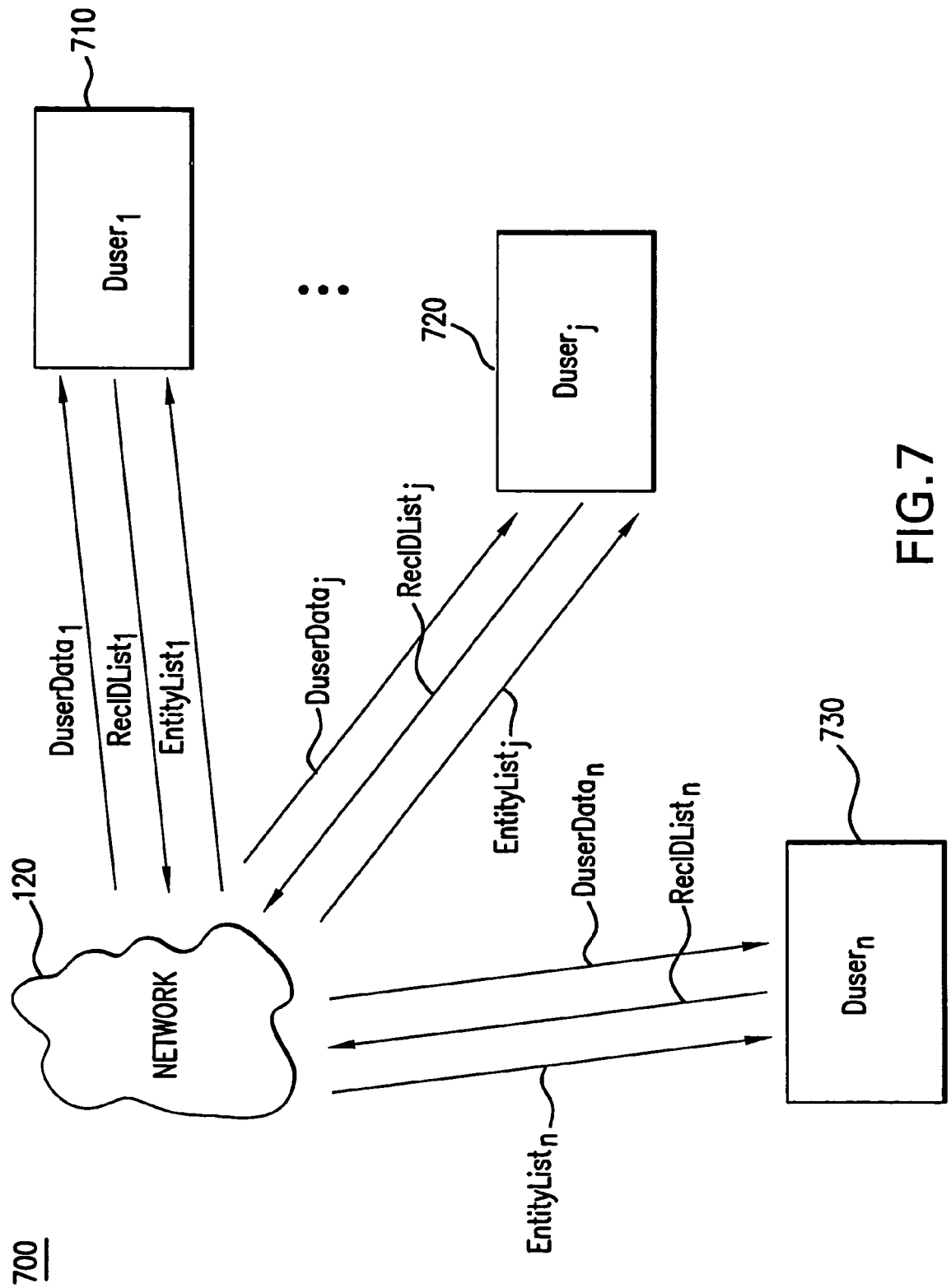
FIG. 7 shows multiple DataUsers connecting to a network.

While there may be multiple DataSuppliers 110, there may also be multiple DataUsers 130, each may receive data from a plurality of data suppliers. This is illustrated in FIG. 7 where network 120 is independently connected to a plurality of data users 710, . . . , 720, . . . 730. As indicated in FIG. 7, a data user, DataUserj, $1 \leq j \leq n$, receives data DuserDataj from network 120 that is connected to a plurality of data suppliers (shown in FIG. 2). The received data at a data user may comprise the data from multiple data suppliers. One exemplary composition of received data at a data user is illustrated in FIG. 8. DuserDataj includes the data tuples from $j_k$ data suppliers, each data supplier supplying a set of $j_i$ records. Each record comprises a record ID (DsupplierID plus record number RecNum) and a non-identifying record (Rec).

Depending on how the received data is to be used, a data user may need to know whether some of the data records are actually correlated. That is, whether there are multiple records that are related to each other and belong to a same entity. When such a need arises, a data user has to rely on a third party, the entity correlator, to perform the correlation task. Such a third party should be trusted, such that it does not reveal identifying information to any of the DataSuppliers and DataUsers.

To correlate different records, the data user generates a RecIDList containing the record IDs of the records in question and sends the RecIDList to entity correlator 140. FIG. 9 shows an exemplary record ID list sent to the entity correlator 140. Each record ID in FIG. 9 includes both a data supplier ID (DsupplierID) and a record number (RecNum). FIG. 9 shows that a DataUser may include the data from multiple DataSuppliers. To request a correlation service, this RecIDList is sent, as indicated in FIG. 7, to the entity correlator via network 120. Once the entity correlator 140 fulfills the requested service, an EntityList is sent back to and received at the data user that requested the service.

Figure 10:
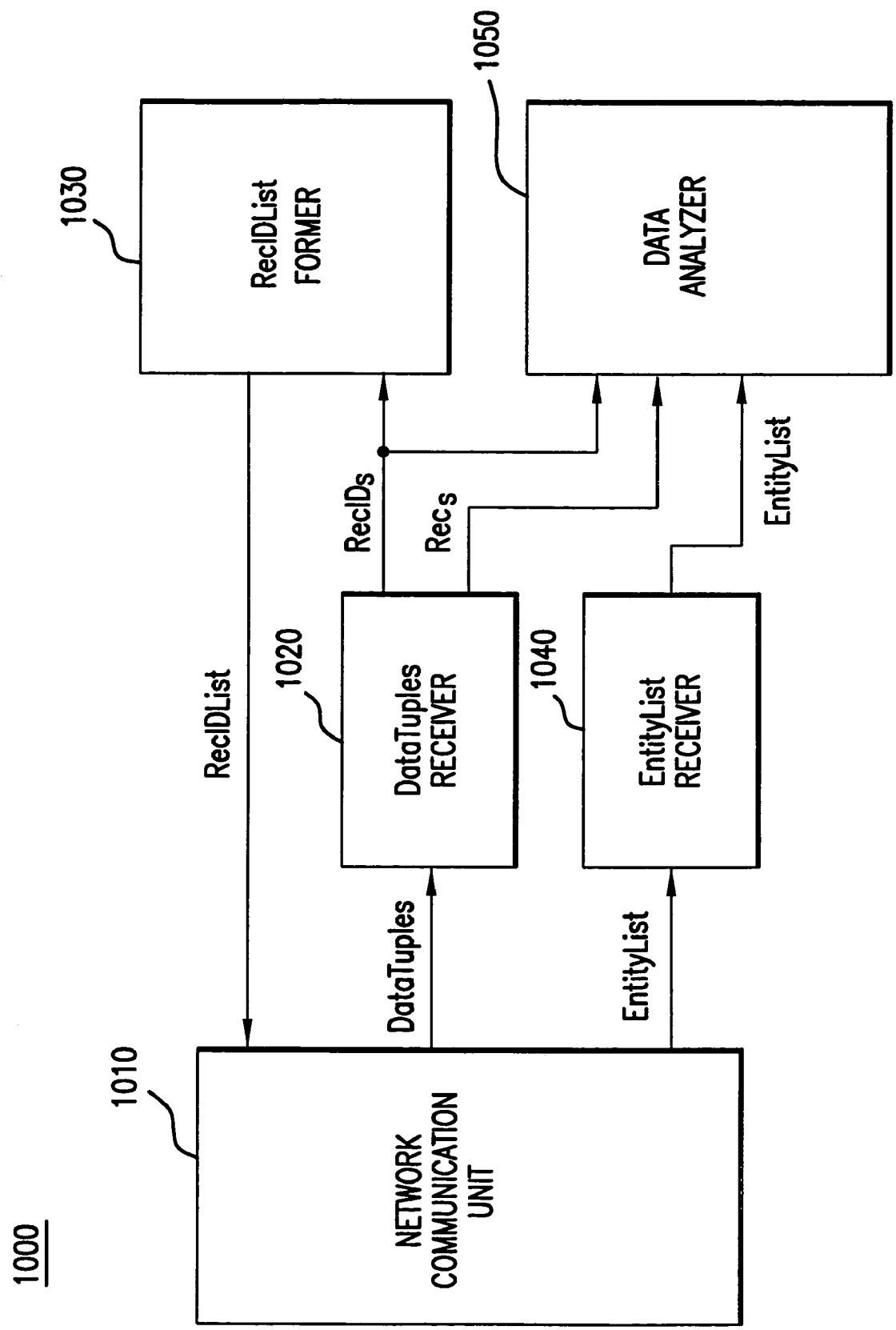
FIG. 10 illustrates an embodiment of the invention, in which a DataUser communicates with both DataSupplier and an entity correlator to obtain correlated data.

FIG. 10 illustrates an embodiment of the invention in which the block diagram of a data user is presented. A network communication unit 1010 enables data transfers between the data user and network 120. Data tuples are received by a data tuple receiver at 1020 where record IDs and the non-identifying records are separated. Receiver 1020 then sends the record IDs to a RecIDList former 1030 and non-identifying records to a data analyzer 1050, respectively. Record IDs are used by former 1030 to generate a RecIDList that contains the record IDs of the records whose correlation is to be identified before they can be further used for analysis. Former 1030 sends this list with a request to entity correlator 140. Upon the return from the entity correlator, the second receiver 1040 intercepts the returned entity list (EntityList) and forwards the EntityList to data analyzer 1050. With the non-identifying records from receiver 1020 and the entity list from receiver 1040, data analyzer 1050 is able to use properly correlated data.

Figure 11:
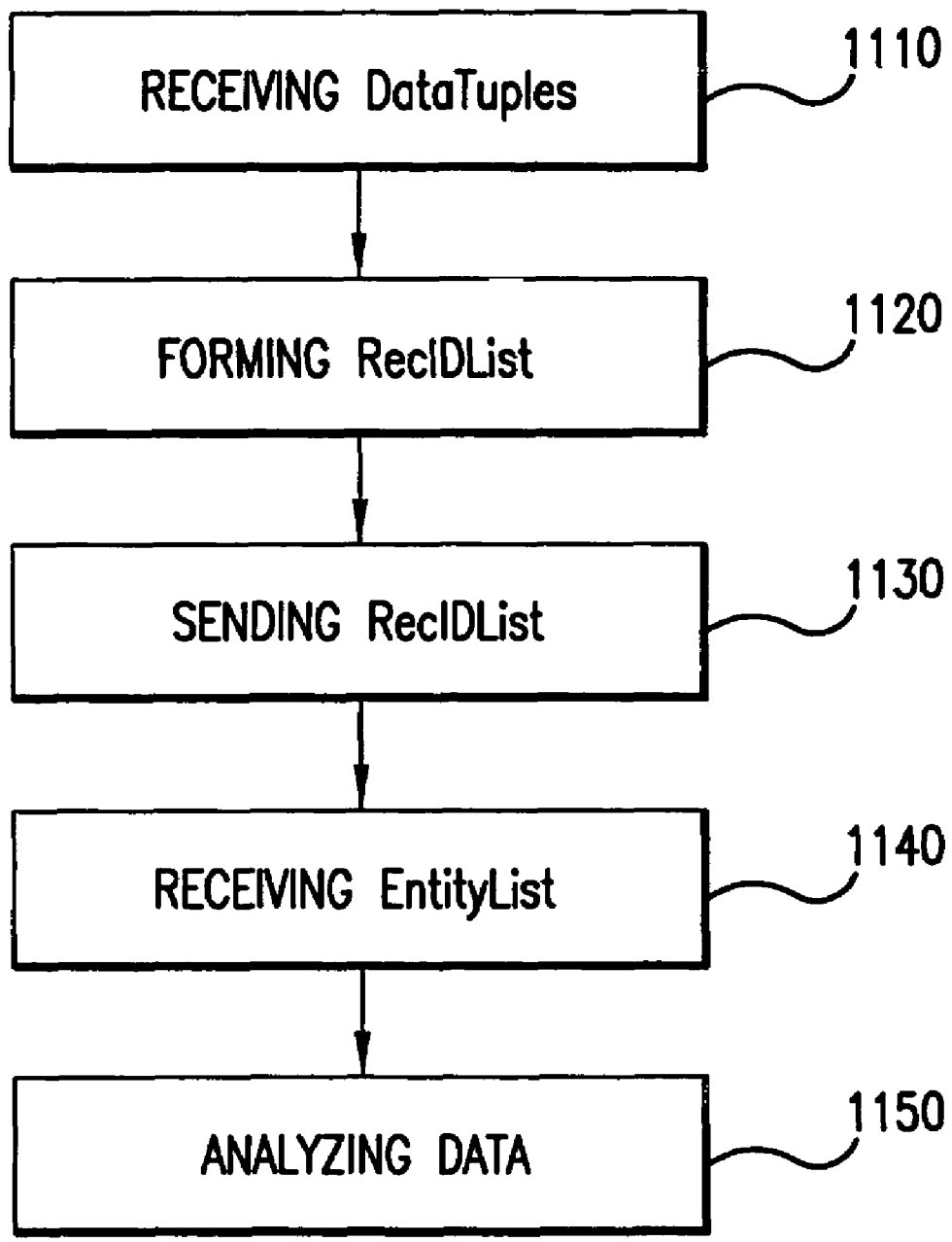
FIG. 11 is a flowchart of an embodiment of the invention for a DataUser.

FIG. 11 describes the flowchart of an embodiment of the invention in which a DataUser performs a sequence of tasks. Data tuples are received at act 1110. Based on received data tuples, a record ID list (RecIDList) is generated at act 1120. Such generated RecIDList is sent to the entity correlator 140 at act 1130 to request entity correlation service. The returned results include an entity list (EntityList) which is received at act 1140. Together with the received data tuples, the entity list is used at 1150 to perform further analysis based on properly correlated records.

Figure 12:
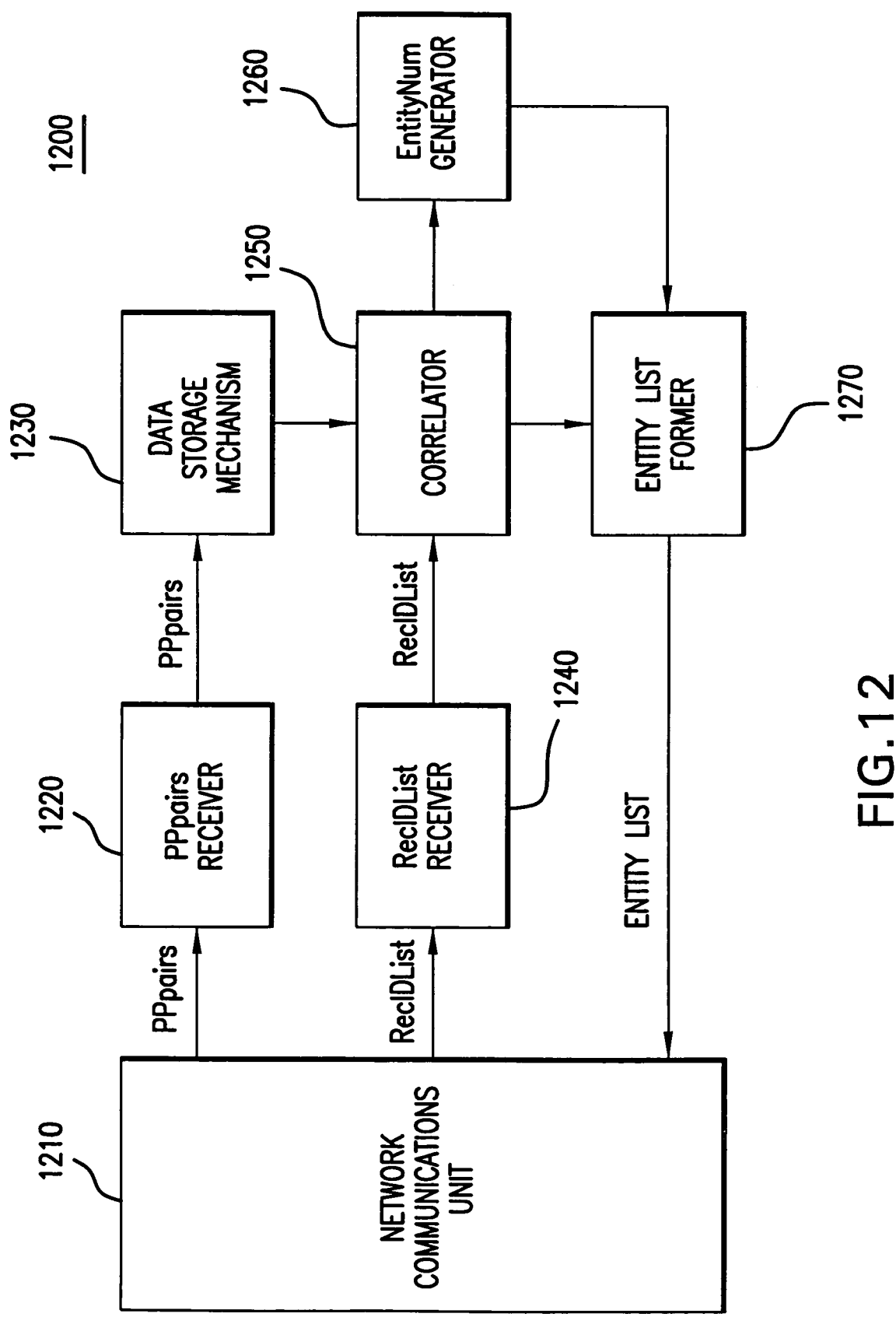
FIG. 12 illustrates an embodiment of the invention, in which the block diagram of an entity correlator is shown.

In FIG. 12, a high level diagram of an entity correlator is described. With a network communications unit 1210, data transfer into and out of the entity correlator 140 is enabled. At a data collection stage, PP pairs are sent to entity correlator 140 via network 120. Within the entity correlator 140, a receiver 1220 intercepts the PP pairs and stores them in a data storage 1230. Data stored at 1230 may also be organized according to well defined criteria such as in an ascending order of record IDs within each data supplier.

To perform entity correlation, upon receiving the service request at 1240 in the form of a record ID list (RecIDList), the correlator 1250 is invoked. Both the pre-stored PP pairs and the list of record IDs in question (RecIDList) are supplied to correlator 1250. The record IDs from RecIDList may be used to retrieve the PP pairs that contain the same record IDs. The corresponding identifying information found in different PP pairs may be further compared to see whether they are actually the same. If two record IDs from a data supplier retrieve the PP pairs that have the same identifying information, the two records belong to the same entity. For example, a patient (i.e., one entity) may have blood test results on different dates (i.e., different records) from the same laboratory (i.e., one data supplier). If two pieces of identifying information from different data suppliers are identified as the same, all the records whose record IDs correspond to these two pieces of identifying information are identified as correlated to one another. That is, they all belong to the same entity. For example, if a patient (i.e., one entity) has multiple records (i.e., different records) from each of a plurality of test laboratories (i.e., multiple data suppliers), all of this patient's records belong to the same entity.

When the correlation relationships are recognized, the entity correlator may report to the service requester, a data user, in the form of an entity list, including which set of record IDs are to be grouped together to correspond to which entity. In order not to compromise the confidentiality, even though the precise identity of each entity is known (via the identifying information found in PP pairs), such identifying information cannot and should not be used in returned results. Instead, a pseudo entity number may be generated, one for each entity. This is achieved by an entity number generator 1260. Such generated entity numbers are paired with the groups of record IDs that are recognized as corresponding to a same entity. An entity list (EntityList) is formed at 1270. An exemplary EntityList is given in FIG. 13 where there are multiple entities, each identified by a unique entity number, and each of the entities may correspond to a plurality of record IDs from possibly multiple data suppliers. The EntityList is sent back to the data user that requested the service via a network communications unit 1210.

Figure 14:
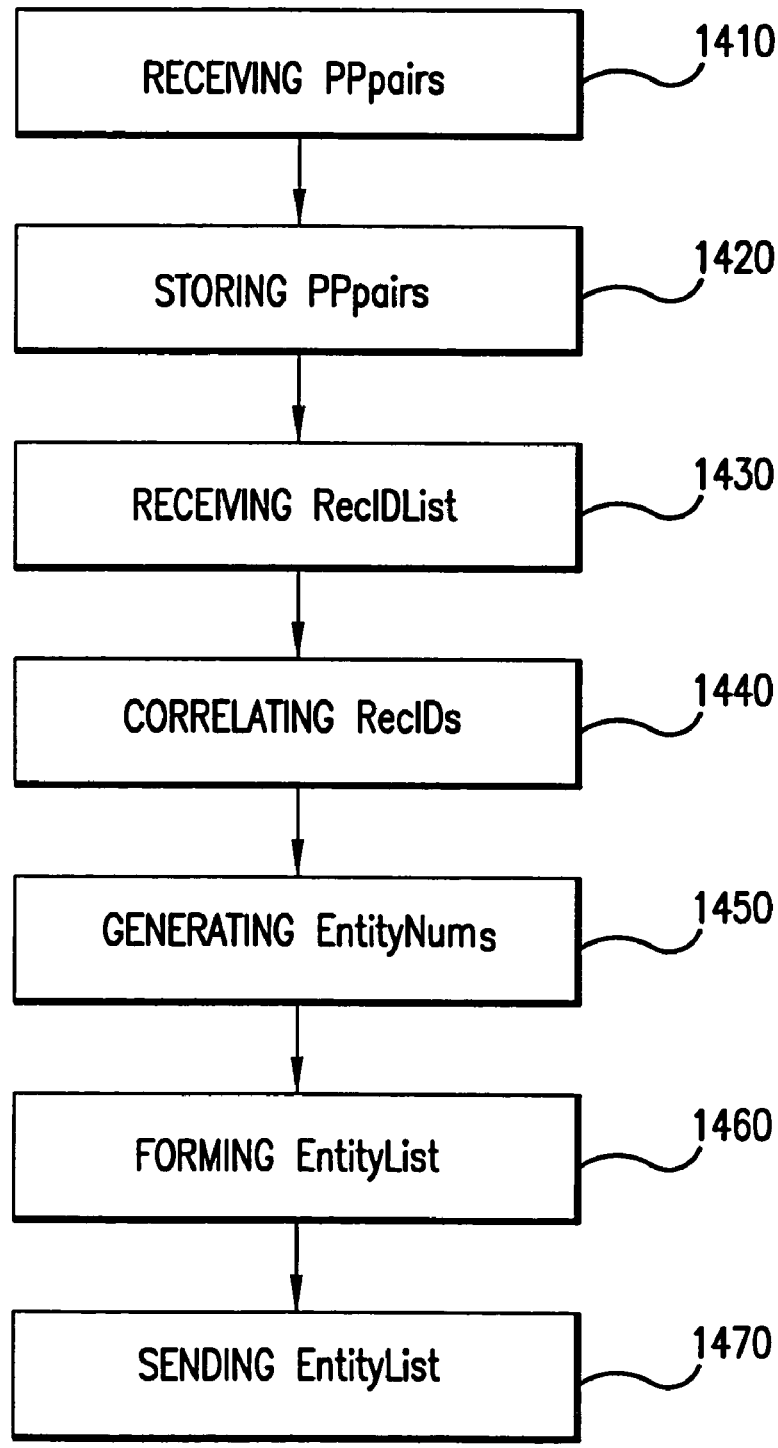
FIG. 14 is a flowchart of an embodiment of the invention, in which an entity correlator performs data correlation.

FIG. 14 describes a flowchart of an embodiment of the invention in which an entity correlator performs a sequence of tasks. Upon receiving the PP pairs sent from at least one DataSupplier, at act 1410, such information is stored in a storage 1230 at act 1420 so that it can be later retrieved. When a service request arrives together with a record ID list (RecIDList) at act 1430, a correlator 1250 is invoked that correlates, at act 1440, the record IDs in the input RecIDList based on its stored PP pairs. For each group of such correlated record IDs, an entity number is generated at act 1450. The correlation result and its corresponding entity numbers are used at act 1460 to form an EntityList. This EntityList is sent back, at act 1470, to the data user that requested the service.

The invention may be implemented in hardware or a combination of hardware and software. The software may be recorded on a medium for reading into a computer memory and for executing. The medium may be, but is not limited to, for example, a floppy disk, a CD ROM, a writable CD, a Read Only Memory (ROM), and an Electrically Alterable Read Only Memory (EAPROM).

The above description is not to be taken in a limiting sense, but is made merely for the purpose of describing the general principles of the invention. The scope of the invention should be determined with reference to the claims.

I claim:

1. A method, comprising:
receiving, by an entity correlator from a DataSupplier, at least one pair of a record ID and an identifying ID, both being associated with a third-party entity, the record ID including a Supplier ID to identify the DataSupplier, and a RecNum, the RecNum being an identification number assigned by the DataSupplier to the third-party entity to identify the third-party entity and parties other than the DataSupplier cannot identify the entity based solely on the RecNum, and the at least one pair being transmitted in conjunction with a data tuple including the record ID and a record, the record including information about the third-party entity but lacking identifying information to identify the third-party entity;
storing said at least one pair in a memory;
utilizing the identifying ID to identify the third-party entity associated with the RecNum contained in the record ID;
correlating a plurality of RecNums received from a plurality of DataSuppliers to the third-party entity;
receiving a record ID list from a DataUser at said entity correlator; said record ID list including at least one selected record ID;
generating an entity list, by said entity correlator, said entity list correlating said third-party entity in the entity list with one of said record IDs included in said record ID list; and
sending said entity list from said entity correlator to said DataUser.

2. The method of claim 1, wherein said record includes a medical record.

3. The method of claim 1, wherein said record includes a personal record.

4. The method of claim 1, wherein said third-party entity includes a company.

5. The method of claim 1, wherein said third-party entity includes an organization.

6. A method, comprising:
assigning, by a DataSupplier, an identification number, called a RecNum, to a third-party entity to identify the third-party entity, the RecNum not being able to be used by other parties to identify the third-party entity;
generating data about the third party-entity, including a record containing information about the third-party entity but lacking information to identify the third-party entity, and a record ID, including a supplier ID to identify the DataSupplier;
sending at least one data tuple from the DataSupplier to a DataUser, said at least one data tuple including the record ID and the record;
sending, from the DataSupplier to an entity correlator, at least one pair of the record ID and an identifying ID, both being associated with the third-party entity, the identifying ID identifying the third-party entity associated with the RecNum contained in the record ID,
wherein the record ID is later utilized to correlate all records associated with the third-party entity.

7. The method of claim 6, wherein said record includes a medical record.

8. The method of claim 6, wherein said record includes a personal record.

9. The method of claim 6, wherein said third-party entity includes a company.

10. The method of claim 6, wherein said third-party entity includes an organization.

11. A method, comprising:
receiving, at a DataUser, at least one data tuple from a Data Supplier, each data tuple including a unique record ID and a record, said record containing information about a third-party entity, said record ID including a Supplier ID to identify the DataSupplier, and a Recnum, said RecNum being an identification number assigned by the DataSupplier to the third-party entity to identify the third-party entity, wherein parties other than the DataSupplier cannot identify the third-party entity based solely on the RecNum;
forwarding a record ID list from said DataUser to an entity correlator, said record ID list including at least one record ID, said DataUser gathering information about the third-party entity from a plurality of Data-Suppliers; and
receiving an entity list from said entity correlator, said entity list correlating said third-party entity in the entity list with one of said record IDs included in said record ID list.

12. The method of claim 11, wherein said record includes a medical record.

13. The method of claim 11, wherein said record includes a personal record.

14. The method of claim 11, wherein said third-party entity includes a company.

15. The method of claim 11, wherein said third-party entity includes an organization.

16. A system, comprising:
a DataSupplier to generate at least one data tuple, to send said at least one data tuple, to generate at least one pair, and to send the at least one pair, the at least one data tuple including a record ID and a record, each pair including the record ID and an identifying ID, wherein the DataSupplier generates data about a third-party entity which is included in the record, the record ID including a Supplier ID to identify the DataSupplier and a RecNum, the RecNum being an identification number assigned by the DataSupplier to identify the third-party entity, wherein parties other than the Data-Supplier cannot identify the third-party entity based solely on the RecNum, the identifying ID identifying the third-party entity, and the record lacking information to identify the third-party entity;
a DataUser to receive said at least one data tuple from said DataSupplier, to gather information about the third-party entity from a plurality of DataSuppliers, to generate a record ID list including said record ID from at least one data tuple, and to send said record ID list; and
an entity correlator to receive said at least one pair from said DataSupplier, to receive said record ID list, to produce an entity list based on said record ID List, said entity list including said RecNum assigned to the third-party entity, said RecNum being matched to one of said at least one record ID from said record ID list, and to send said entity list to said Data User.

17. The system of claim 16, wherein said DataSupplier includes,
a collector to collect data, said data including the record and the identifying ID,
a generator to generate the record ID,
a former to form said at least one data tuple, the at least one data tuple including the record ID and the corresponding record, and
an extractor to extract the record ID and the identifying ID, which form said at least one pair.

18. The system of claim 16, wherein said DataUser includes,
a first receiver to receive at least one data tuple from said DataSupplier;
a former to form said record ID list based on said at least one data tuple received by said first receiver; and
a second receiver to receive said entity list from said entity correlator.

19. The system of claim 16, wherein the third-party entity is not the DataSupplier, the DataUser, or the entity correlator.

20. The system of claim 16, wherein the RecNum is unique to the third-party entity.

21. The system of claim 16, wherein the identifying ID is a social security number.

22. The system of claim 16, wherein the identifying ID is a name.

23. An entity correlator, comprising:
a receiver to receive at least one pair, the at least one pair including a record ID and an identifying ID, the at least one pair being transmitted in conjunction with said record ID and a record;
a storage mechanism to store said at least one pair;
a second receiver to receive a record ID list including the at least one record ID from a data user;
a correlator to correlate the at least one record ID included in said record list according to said record ID stored in the storage mechanism;
a generator to generate at least one entity number, each entity number corresponding to said identifying ID;
a former to form an entity list with at least one entity, the entity list listing the at least one entity and the at least one record ID; and
a transmitter to send the entity list to said data user.

24. The entity correlator of claim 23, wherein the third-party entity is not the DataSupplier, the DataUser, nor the entity correlator.

25. The entity correlator of claim 23, wherein the RecNum is unique to the third-party entity.

26. The entity correlator of claim 23, wherein the identifying ID is a social security number.

27. The entity correlator of claim 23, wherein the identifying ID is a name.

* * * * *